(12) United States Patent
Mason et al.

(10) Patent No.: US 9,040,014 B2
(45) Date of Patent: May 26, 2015

(54) GRAPHITE THERMAL DECONTAMINATION WITH REDUCING GASES

(75) Inventors: J. Bradley Mason, Donnelly, ID (US); Thomas Brown, Atlanta, GA (US); Sahar Torabzadeh, Atlanta, GA (US); Jonathan Olander, Jonesborough, TN (US)

(73) Assignee: Electricite de France, Paris (FR)

( * ) Notice: Subject to any disclaimer, the term of this patent is extended or adjusted under 35 U.S.C. 154(b) by 126 days.

(21) Appl. No.: 13/278,786

(22) Filed: Oct. 21, 2011

(65) Prior Publication Data

US 2013/0101496 A1  Apr. 25, 2013

(51) Int. Cl.
*C01B 31/04* (2006.01)
*B01D 59/02* (2006.01)
*G21F 9/30* (2006.01)
*G21F 9/02* (2006.01)

(52) U.S. Cl.
CPC *B01D 59/02* (2013.01); *G21F 9/30* (2013.01); *G21F 9/02* (2013.01)

(58) Field of Classification Search
CPC .............. G21F 9/02; G21F 9/30; B01D 59/02
USPC .................................................. 423/460, 448
See application file for complete search history.

(56) References Cited

U.S. PATENT DOCUMENTS

2008/0181835 A1\* 7/2008 Mason .......................... 423/249

OTHER PUBLICATIONS

Fachinger, et al., Decontamination of nuclear graphite, Nuclear Engineering and Design 2008; 238: 3086-3091.\*

\* cited by examiner

*Primary Examiner* — Daniel C McCracken
(74) *Attorney, Agent, or Firm* — Drinker Biddle & Reath LLP

(57) ABSTRACT

Providing a roaster that operates at temperatures in the range of 800° Celsius to 2000° Celsius with inert, optional oxidizing and reducing gases to treat graphite contaminated with radionuclides including tritium, carbon-14, and chlorine-36. The combination of temperatures and gases allow for the removal of most to substantially all the carbon-14 within the graphite while substantially limiting gasifying the bulk graphite.

15 Claims, 3 Drawing Sheets

GRAPHITE THERMAL DECONTAMINATION WITH REDUCING GASES

TECHNICAL FIELD

The present invention relates generally to methods for decontamination of graphite to remove tritium, carbon-14, and chlorine-36 using thermal treatment with purge gases that include reducing gases.

BACKGROUND

Graphite, which consists predominantly of the element carbon, is used as a moderator in a number of nuclear reactor designs, such as the MAGNOX and AGR gas cooled reactors in the United Kingdom, and the RBMK design in Russia. During construction, the moderator of the reactor is usually installed as an interlocking structure of graphite bricks. At the end of reactor life, the graphite moderator, typically weighing about 2,000 tons, is a form of radioactive waste that requires safe disposal. Graphite is a relatively stable chemical form of carbon, which is in many ways suitable for direct disposal without processing. However, after neutron irradiation, the graphite will contain stored Wigner energy. The potential for release of this energy needs to be accommodated in any strategy which relies on disposing of the graphite in unprocessed form. Alternatively, processing the graphite before disposal can allow the safe release of any stored Wigner energy.

The graphite also contains significant quantities of radionuclides from neutron induced reactions, both in the graphite itself and in the minor impurities which it contains. Because of the structure of graphite, which includes loosely packed foliates or layers, the radioisotopes can become trapped within the spaces or pores of the graphite. The radioisotope content can conveniently be divided into two categories—short-lived isotopes and long-lived isotopes. Short-lived isotopes (such as cobalt-60) make the graphite difficult to handle immediately after reactor shutdown, but they decay after a few tens of years. Long-lived isotopes (principally carbon-14 and chlorine-36) are of concern through the possibility of their discharge to the biosphere. Carbon-14 is produced in the graphite in one of two ways. One way is the activation of nitrogen gas, with the carbon-14 present in pores of the graphite as carbon dioxide gas. The second way is through the neutron activation of carbon-13, which is a natural, stable isotope of carbon, making up just over 1 percent of the carbon in the graphite. Carbon-14 produced in this way would be part of the graphite matrix. Chlorine-36 is formed in a similar manner by irradiation of chlorine left in the graphite matrix during the graphite sintering process. Processing the graphite offers the opportunity to separate the majority of the graphite mass (carbon) from the long-lived radioisotopes. This processing in turn facilitates disposal of the graphite waste shortly after the end of the reactor life, and may permit recycling.

Because of the characteristics of graphite and its mass, the most common procedure to date for decommissioning graphite-moderated reactors is to store the reactor core in-situ for a period of tens of years following reactor shut-down. During this period, short-lived radioisotopes decay sufficiently to allow eventual manual dismantling of the graphite moderator. Most plans then assume that the graphite will be disposed of in its existing chemical form, with appropriate additional packaging to prevent degradation or release over the long period of carbon-14 and chlorine-36 decay.

Storage has certain negative consequences, such as the following: 1) an implication of long-term financial liability, 2) a visually intrusive storage structure that has no productive purpose, and 3) a requirement imposed on a future generation (which gained no benefit from the original asset) to complete eventual clearance. If the storage alternative is to be replaced by shorter term management, it is essential for the graphite to be processed in a safe and radiologically acceptable manner.

Certain prior techniques for treating radioactive graphite applied heat and oxidizing gases to treat the graphite in order to remove a sufficient fraction of the long-lived radionuclides within the graphite. These processes have shown that heating or "roasting" with inert gases, such as nitrogen or argon, alone can remove substantially all the hydrogen-3 (tritium) but the process cannot remove more than about sixty (60) percent of the carbon-14. Alternative processes have been performed to improve the carbon-14 removal by adding limited quantities of oxygen containing gases to the inert gas to provide oxygen that can preferentially convert the carbon-14 to carbon monoxide or carbon dioxide gases, that then can removed from the graphite. Testing with inert gases and oxygen containing gases (steam, carbon dioxide, nitrous oxide, oxygen) has shown that improved carbon-14 removal is possible but the presence of oxygen tends to dramatically increase the gasification of the bulk graphite. To reduce this gasification effect when oxygen containing gases are combined with the inert gases, the operating temperature of the roasting process must be reduced or limited to prevent excessive bulk graphite gasification. Unfortunately, by reducing or limiting the roasting temperature, the amount of carbon-14 removal is also greatly reduced or limited. As a consequence, when oxygen containing gases are introduced with the inert gases, the concentration of these oxidizing gases must be lowered so that higher temperatures can be used. Still, when roasting temperatures exceed approximately 1200° Celsius, the amount of bulk graphite gasified is excessive regardless of the reduced concentration of oxygen containing gases that are used.

The results of testing of these processes demonstrate that, if the concentration of oxygen containing gases is limited sufficiently to reduce bulk graphite gasification at temperatures greater than approx. 1200° Celsius, then the carbon-14 removal is greatly reduced to less than approx. sixty (60) percent, which is unsatisfactory. If the oxygen containing gas concentration is increased such that carbon-14 removal is satisfactory then too much bulk graphite is gasified. In either case, an objective of volatilizing more than ninety (90) percent of the carbon-14 while simultaneously reducing bulk graphite gasification to less than five (5) percent by weight cannot be achieved with these conventional methods.

What is needed are systems and methods that can subject the graphite to a sufficient temperature range to volatilize the radionuclides without gasifying the bulk graphite and specifically systems and methods that can remove greater than 90 percent of the carbon-14 while gasifying less than 5 percent of the bulk graphite.

SUMMARY OF THE INVENTION

Exemplary embodiments of the present invention provide methods that can subject the graphite to a sufficient temperature range to volatilize the radionuclides without significantly gasifying the bulk graphite. One aspect of the invention provides a method that includes the steps of (1) heating a roaster to a temperature between 800° Celsius to 2000° Celsius; (2) introducing graphite contaminated with radionuclides into the roaster; (3) introducing an inert gas into the roaster; (4) introducing a reducing gas into the roaster; and (5) removing volatilized radionuclides from the roaster. This method may also include the additional steps of:

adding an oxidizing gas into the roaster, and/or
reducing the size of the graphite prior to introducing the graphite into the roaster.

This method may also be characterized where:
less than five (5) percent of the graphite is gasified;
the temperature of the process is between 1200° Celsius to 1500° Celsius;
the radionuclides comprise carbon-14 and at least seventy (70) percent of the carbon-14 is removed from the graphite;
the radionuclides comprise carbon-14 and at least ninety (90) percent of the carbon-14 is removed from the graphite;
the purge gas comprises at least one of nitrogen, helium, and argon and the reducing gas comprises at least one of hydrogen, hydrazine, ammonia, and hydrocarbon vapor;
the purge gas comprises one or more reducing gases that can produce free hydrogen, ammonium, or organic vapor;
the oxidizing gas comprises at least one of steam, carbon dioxide ($CO_2$), nitrous oxide ($N_2O$), oxygen ($O_2$), air, alcohols (with OH groups), or other oxygenated vapors;
the steps of introducing the inert gas into the roaster and introducing the reducing gas into the roaster comprise introducing the inert gas and the reducing case at a location near the bottom of the reactor and wherein the inert gas and the reducing gas flow through the graphite; and/or
the roaster comprises a vertically-oriented moving bed reactor and where the step of introducing graphite contaminated with radionuclides into the roaster includes introducing the graphite near the top of the roaster and where the steps of introducing the inert gas into the roaster and introducing the reducing gas into the roaster include introducing the gases near the bottom of the roaster.

DETAILED DESCRIPTION OF EXEMPLARY EMBODIMENTS

The exemplary embodiments of the present invention provide systems and methods for treating radioactive graphite contaminated with tritium, carbon-14, and chlorine-36 and other radionuclides generated during the operation of a nuclear reactor or other nuclear process. The systems and methods include a roaster that operates at temperatures in the range of 800° Celsius to 2000° Celsius with inert, optional oxidizing and reducing gases. The combination of temperatures and gases allow for the removal of greater than 90 percent of the carbon-14 within the graphite while gasifying less than 5 percent of the bulk graphite.

Figure 1:
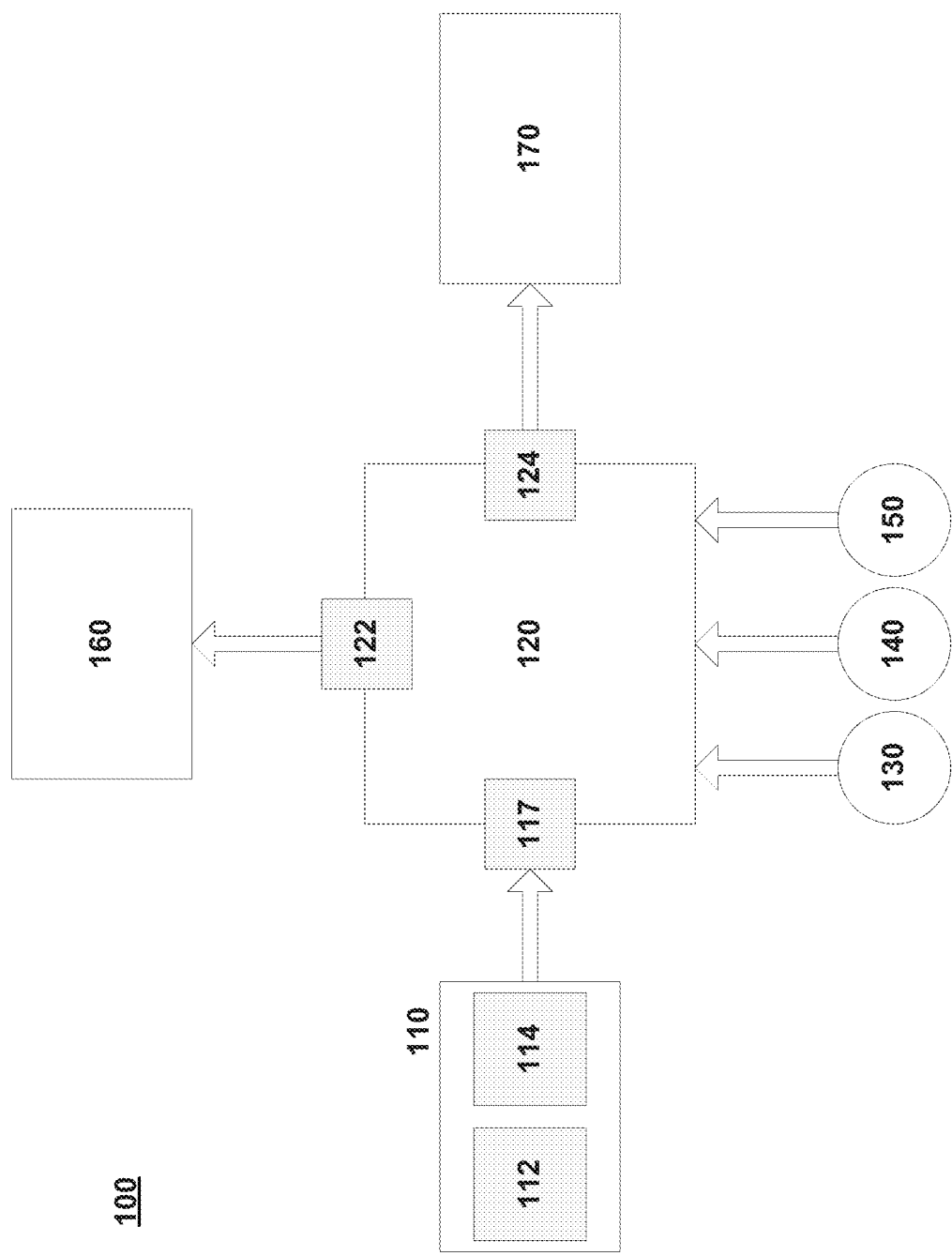
FIG. 1 depicts a block diagram of a system for treating radioactive graphite in accordance with an exemplary embodiment of the present invention.

FIG. 1 depicts a block diagram of a system 100 for treating radioactive graphite in accordance with an exemplary embodiment of the present invention. Referring to FIG. 1, a materials handling component 110 receives graphite to be treated in the system 100. Typically, the graphite was used as the moderator in a nuclear reactor core. Other sources of graphite include, but are not limited to, fuel element sleeves, braces, or other reactor components irradiated by the neutron flux of the reactor. This graphite will typically be contaminated with radionuclides such as hydrogen-3 (tritium), carbon-14, chlorine-36, iron-55, and cobalt-60 and may include other typical fission and activation products.

The material handling component 110 sizes and holds the graphite in preparation for introducing the graphite into a roaster 120. The graphite received into the materials handling component 110 would have been removed from the nuclear reactor by any conventional process. These processes may include wet processes, dry processes, or a combination of both. The present invention can accommodate either dry or wet graphite in any size or shape resulting from the removal process. Further, the graphite may be soaked in water or other solution prior to being received into the materials handling component 110.

The graphite may be treated in granular or powdered form. A size reducer subcomponent 112 of the materials handling component 110 reduces the size of the received graphite prior to its introduction into the roaster 120. In this exemplary embodiment, the received graphite is reduced to a size less than 20 mm. This small size enhances the volatilization of radionuclides from the graphite. To reduce the size of the graphite, the exemplary size reducer subcomponent 112 includes a jaw or rotary crusher. Other size reducing equipment may be used. A hopper subcomponent 114 of the materials handling component 110 receives the size reduced graphite and holds the graphite awaiting introduction into the roaster 120. The internal atmosphere of the exemplary size reducer subcomponent 112 and hopper subcomponent 114 includes an inert gas blanket, such as argon, nitrogen, carbon dioxide, or other similar inert gas. The internal atmosphere of the exemplary size reducer subcomponent 112 and hopper subcomponent 114 is connected to the off-gas system of the roaster 120, as some radionuclides may be released from the graphite during the size reduction process. In an alternative embodiment, the graphite may be received in a form and size suitable for introduction into the roaster 120 without the need for size reduction. Similarly, a continuous process may omit the hopper subcomponent 114.

The roaster 120 includes a vessel used to treat the sized graphite. The roaster 120 operates in a temperature range of between 800° Celsius to 2000° Celsius. The capacity, shape, and size of the roaster 120 can vary by application. The roaster 120 is constructed of materials suitable for high temperature operations, such as a refractory-lined steel vessel. The operating pressure can vary from a strong vacuum to slightly pressurized. Any type of roaster or apparatus including a fluidized bed, moving bed, batch or static bed roaster can be used. One exemplary roaster is a vertically oriented moving bed roaster, where the fresh graphite enters the top of the pile and the treated graphite is removed from the bottom of the pile while the purge gas flow upward (counter current) thru the graphite pile. (See FIG. 3, discussed below) Batch treatment of the graphite would typically involve powdered graphite using a fluidized bed approach. For graphite that is larger than powders, a continuous moving bed roaster is preferred. In the exemplary embodiment, the roaster 120 is electrically heated, but other types of heating could be used. Electrical heating is preferred as it reduces the need to introduce oxidizing gases into the vessel, which can gasify the bulk graphite and facilitates temperature control and energy efficiency. The roaster 120 receives graphite from a materials inlet 117. A variety of mechanical techniques may be used to move the graphite from the materials handling component 110 to the roaster 120 through the materials inlet 117. In an exemplary system, a double valve airlock technique is used to prevent gases from inside the roaster from escaping the roaster and to limit the introduction of gases other than inert gases into the roaster with the graphite.

The roaster 120 includes gas inlets 130, 140, 150 to receive one or more inert purge gases, one or more reducing gases, and optionally one or more oxidizing gases. Of course, the gas inlets 130, 140, 150 can be a single inlet connected to three different gas sources, one source providing inert purge gas, a second source providing reducing gas, and a third source providing an oxidizing gas. Typically, the gas inlet or inlets would be positioned near the bottom of the roaster 120, so that the gases can enter the vessel and travel up through the graphite resident in the roaster 120. The gas may be introduced through a flow splitter or distributor to distribute the gas through the volume of graphite, but this component is not required. The roaster includes an outlet 122 for volatilized radionuclides, which are carried out of the outlet 122 by the inert purge gas. The roaster 120 also includes an outlet 124 for the treated graphite.

Volatile radionuclides are carried out of the roaster by the purge gas flow and stabilized in treatment subsystem 160, using an appropriate technique for treating the radionuclides. The treated graphite is further processed in treatment subsystem 170, where it is packaged for ultimate disposal as "clean" (non-radioactive) waste or is recycled.

The carbon-14 is more reactive than or more mobile than the bulk carbon-12 in the graphite matrix. The presence of small amounts of oxygen provide the oxygen necessary to convert the carbon-14 to carbon monoxide. The reducing gases suppress the oxidation of the carbon-12 in the graphite matrix. One exemplary benefit of adding reducing gas is that possible carbon-14 compounds in the graphite include cyanide. The introduction of hydrogen to the roaster will provide hydrogen atoms to bind with the cyanide to produce hydrogen cyanide, which is volatile, thus some carbon-14 can be removed by the presence of the reducing gas, including hydrogen.

Figure 2:
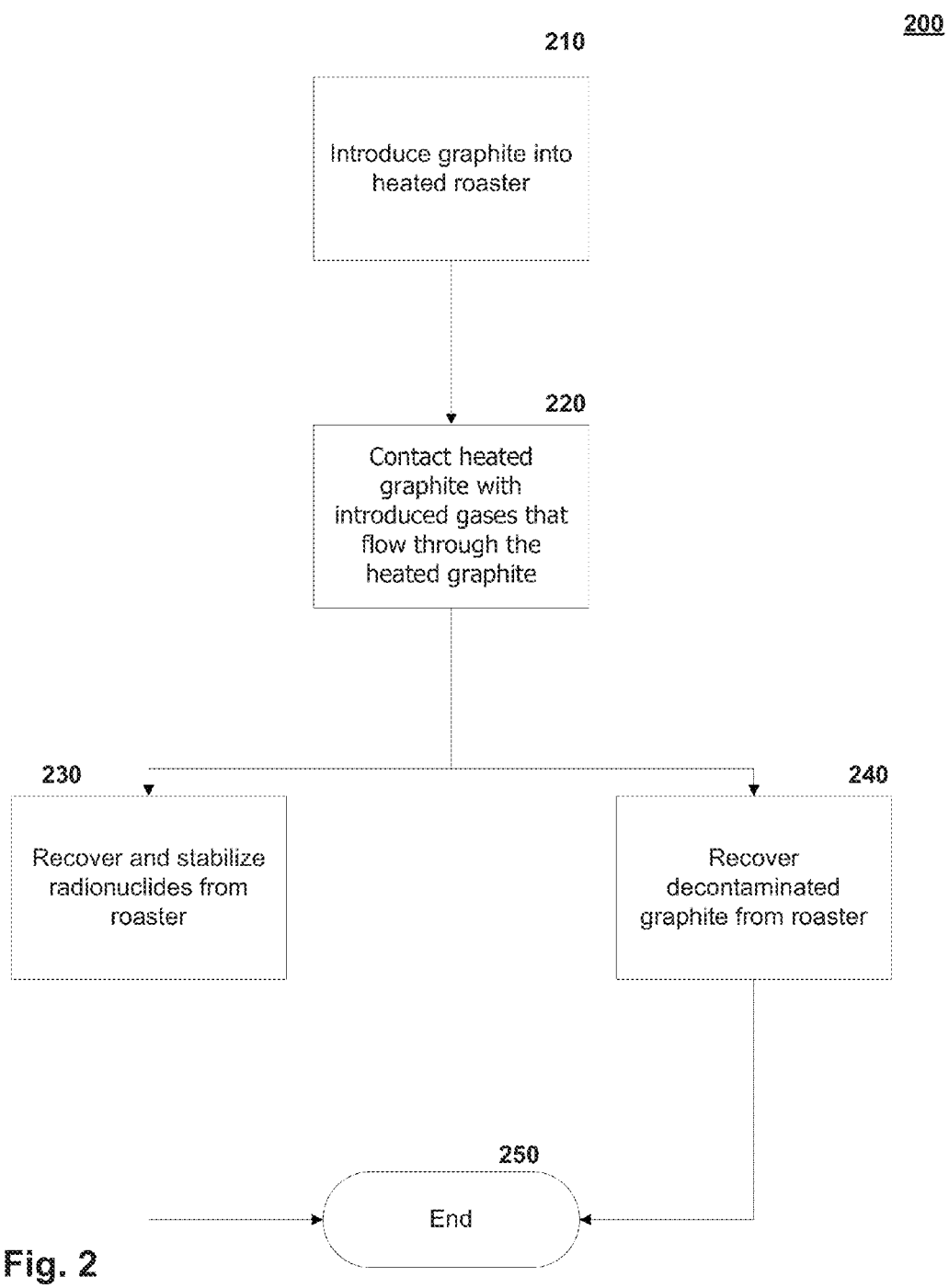
FIG. 2 depicts a flow diagram of a process for treating radioactive graphite in accordance with an exemplary embodiment of the present invention.

FIG. 2 depicts a flow diagram of a process 200 for treating radioactive graphite in accordance with an exemplary embodiment of the present invention. Referring to FIGS. 1 and 2, at step 210, the graphite is introduced into the roaster 120 from the hopper subcomponent 114 of the materials handling component 110 by a mechanical transfer of the graphite into the roaster. In this exemplary embodiment, the process is performed batch-wise. Alternatively, the graphite can be treated in a continuous process, such as where the graphite enters at the top of the roaster 120 and goes out the bottom of the roaster 120 and the reactant gases enter at the bottom of the roaster 120 and go out the top of the roaster 120. The hopper subcomponent 114 may be omitted.

Prior to introducing the graphite into the roaster 120, the roaster 120 is brought up to treatment temperature. This temperature ranges from 800° Celsius to 2000° Celsius. In this exemplary embodiment, the preferred temperature range is 1200° Celsius to 1500° Celsius, as reducing gases are used in this exemplary process. Previous graphite treatment processes for removing carbon-14 from the graphite were limited to temperatures of approximately 1200° Celsius, due to the high gasification of the graphite that resulted from operating a roaster with oxygen containing gases above 1200° Celsius. By introducing reducing gases into the treatment process, the roaster 120 can operate at temperatures greater than 1200° Celsius. These higher operating temperatures enable the release of essentially all of the tritium, substantially all (greater than 90 percent) of the chlorine-36, and most (greater than 70 percent) of the carbon-14 from the graphite.

At step 220, reaction gases are introduced into the roaster 120. These gases contact the heated graphite as they flow through the heated graphite. These reaction gases include at least an inert purge gas and a reducing gas. Purge gases include one or more of nitrogen, argon, or similar non-reactive gas. Inert gases such as carbon dioxide should not be used as these gases would provide an oxygen source that may gasify the bulk carbon. A reducing gas, such as hydrogen, hydrazine, ammonia, hydrocarbon vapor, and other reducing gases that can produce free hydrogen or ammonium or organic vapor, is also introduced at step 220. The amount of reducing gas introduced is between one hundred parts per million and fifty (50 percent) of the total gas introduced and preferably in the range of two (2) to twenty (20) percent and more preferable between two (2) and ten (10) percent. This mixture of inert purge gas and reducing gas is introduced into the roaster 120 near the bottom of the roaster 120. The gas moves up through the graphite and carries the volatilized radionuclides out of the roaster 120 at outlet 124. Even with the inclusion of an oxidizing gas, the inclusion of the reducing gas greatly reduces the gasification of the bulk graphite, such that less than five (5) percent of the bulk graphite is gasified. Further, operating at temperatures about 1200° Celsius and using a mixture of an inert purge gas, oxidizing gas, and reducing gas results in the removal of most to substantially all of the carbon-14. In an alternative embodiment, the reaction gases also include an oxidizer. The presence of oxygen converts the solid carbon-14 to carbon dioxide or CO gas, which facilitates its diffusion from the graphite matrix. The combination of the inert purge gas (preferably nitrogen) with a limited amount of oxygen containing gases, such as steam, carbon dioxide ($CO_2$), nitrous oxide ($N_2O$), oxygen ($O_2$), air, alcohols (OH groups), or other oxygenated vapors, and reducing gas, such as hydrogen provides enhanced carbon-14 radionuclide removal compared to all prior techniques while limiting the gasification of the bulk graphite. The preferred oxidizing gas is steam that would make up approximately one (1) to fifty (50) percent of the total input reaction gases (preferably two (2) to ten (10) percent). If either carbon dioxide or nitrous oxide is used as the oxidizing gas, they would make up approximately one (1) to ten (10) percent of the total input reaction gases. The inclusion of the reducing gas greatly reduces the gasification of the bulk graphite in the presence of the oxidizer, such that less than five (5) percent of the bulk graphite is gasified. The reducing gas shifts the reaction equilibrium for oxygen with the bulk graphite such that the reaction rate of the oxygen containing gas is substantially inhibited thereby preventing that oxidizer from reacting with the bulk graphite.

At step 230, the purge gas is collected in the treatment subsystem 160, where the radionuclides are stabilized using known methods. At step 240, the graphite is removed from the roaster 120 and treated in the treatment subsystem 170. Typically, the treated graphite would be disposed of in a landfill or recycled and would be treated as low-level radioactive waste instead of intermediate-level radioactive wastes. The process ends at step 250. The process may be repeated if necessary.

Figure 3:
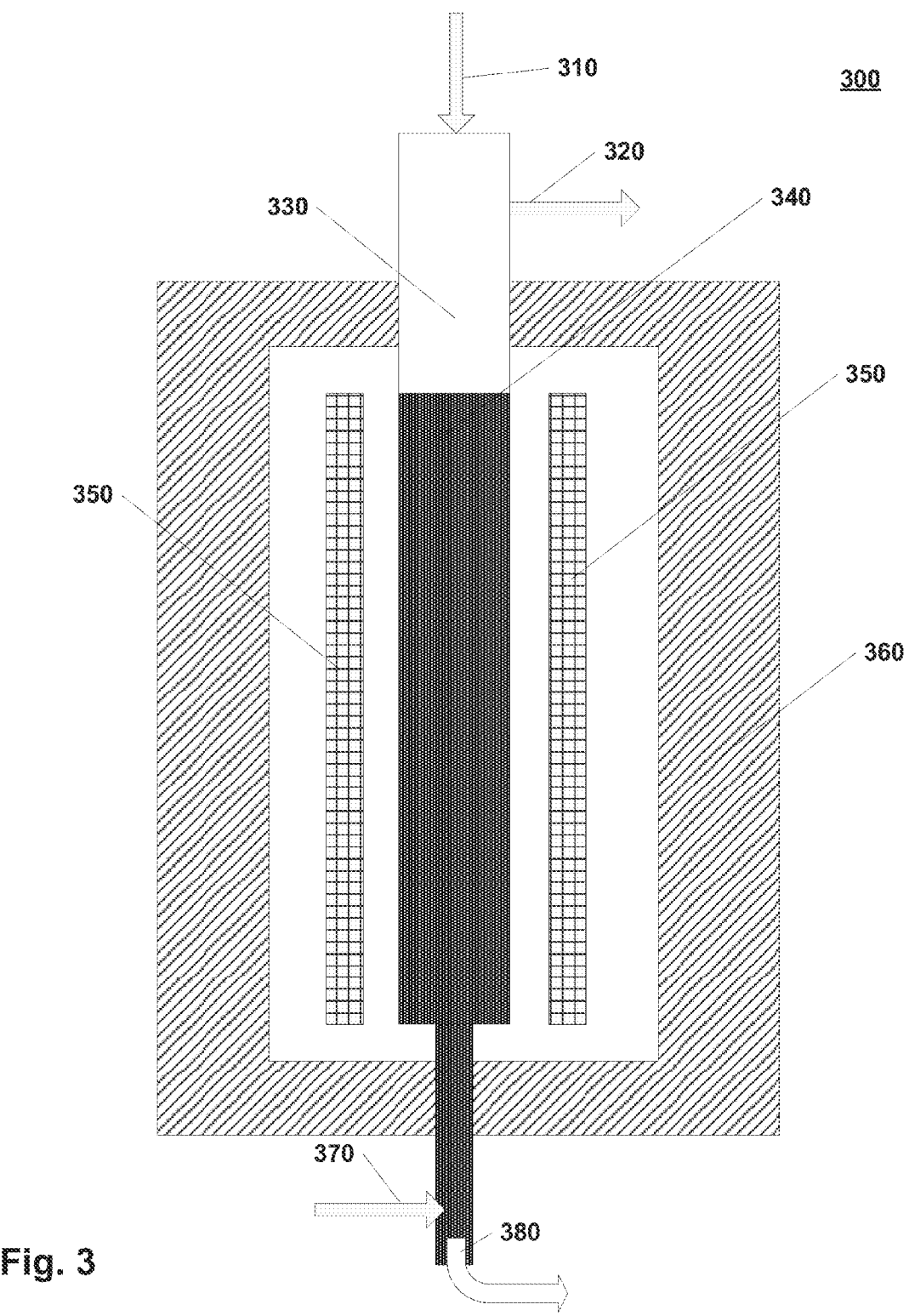
FIG. 3 depicts a schematic diagram of a roaster for treating radioactive graphite in accordance with an exemplary embodiment of the present invention.

FIG. 3 shows a schematic of an exemplary roaster 300. Graphite is introduced through a feeder system (not shown), such as a hopper, at an inlet 310, under a blanket of inert gas. Reaction gases are introduced at an inlet 370, such that the reaction gases flow up through the graphite and out the off-gas outlet 320 as the graphite moves down the vessel 330. As the graphite moves through the vessel 330, which may be a ceramic tube, it is heated (depicted as heated graphite 340).

The vessel 330 is surrounded by a heating source 350, such as electric heating coils. The vessel 330 and heating source 350 are contained within an outer vessel 360, such as a refractory-lined metal shell. Treated graphite is removed from the vessel 330 through an outlet port 380.

One of ordinary skill in the art would understand that the present invention provides methods for treating radioactive graphite contaminated with tritium, carbon-14, and chlorine-36 and other radionuclides generated during the operation of a nuclear reactor or other nuclear process. The methods include a roaster that operates at temperatures in the range of 800° Celsius to 2000° Celsius with inert gases, optional oxidizing gases and reducing gases. The combination of temperatures and gases allow for the removal of most to substantially all the carbon-14 within the graphite while substantially limiting gasifying the bulk graphite.

What is claimed is:

1. A method comprising the steps of:
   heating a roaster to a temperature between 800° Celsius to 2000° Celsius;
   introducing graphite contaminated with radionuclides into the roaster;
   introducing an inert gas into the roaster;
   introducing an oxidizing gas into the roaster so as to initiate an oxidation of said radionuclides; and
   removing volatilized radionuclides from the roaster;
   wherein a reducing gas is further introduced into the roaster in an amount between 2% and 20% of the total gas introduced so as to inhibit an oxidation of C-12 atoms of said graphite during the oxidation of said radionuclides.

2. The method of claim 1 wherein less than five (5) percent of the graphite is gasified.

3. The method of claim 1 wherein the temperature is between 1200° Celsius to 1500° Celsius.

4. The method of claim 1 wherein the radionuclides comprise carbon-14 and at least seventy (70) percent of the carbon-14 is removed from the graphite.

5. The method of claim 1 wherein the radionuclides comprise carbon-14 and at least ninety (90) percent of the carbon-14 is removed from the graphite.

6. The method of claim 1 wherein the inert gas comprises at least one of nitrogen, helium, and argon and the reducing gas comprises at least one of hydrogen, hydrazine, ammonia, and hydrocarbon vapor.

7. The method of claim 1 wherein the reducing gas comprises one or more reducing gases that can produce free hydrogen, ammonium, or organic vapor.

8. The method of claim 1 wherein the oxidizing gas comprises at least one of steam, carbon dioxide ($CO_2$), nitrous oxide ($N_2O$), oxygen ($O_2$), air, alcohols (with OH groups), or other oxygenated vapors.

9. The method of claim 1 wherein the steps of introducing the inert gas into the roaster and introducing the reducing gas into the roaster comprise introducing the inert gas and the reducing case at a location near the bottom of the reactor and wherein the inert gas and the reducing gas flow through the graphite.

10. The method of claim 1 further comprising the step of reducing the size of the graphite prior to introducing the graphite into the roaster.

11. The method of claim 1 wherein the roaster comprises a vertically-oriented moving bed reactor and wherein the step of introducing graphite contaminated with radionuclides into the roaster comprises introducing the graphite near the top of the roaster and wherein the steps of introducing the inert gas into the roaster and introducing the reducing gas into the roaster comprise introducing the gases near the bottom of the roaster.

12. The method of claim 1 wherein the amount of reducing gas is between 2% and 10% of the total gas introduced.

13. The method of claim 1 wherein the amount of oxidizing gas is in the range of 1% to 10% of the total gas introduced.

14. The method of claim 2 wherein the radionuclides comprise carbon-14 and at least seventy (70) percent of the carbon-14 is removed from the graphite.

15. The method of claim 14 wherein at least ninety (90) percent of the carbon-14 is removed from the graphite.

* * * * *